March 24, 1964
T. KENNEDY, JR
3,126,034
PIPE WRAPPING
Filed Dec. 5, 1960
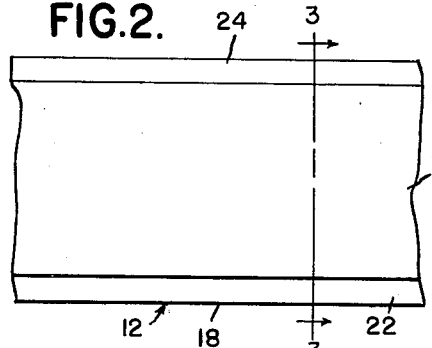
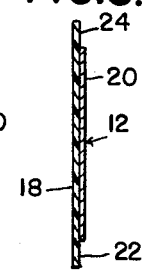
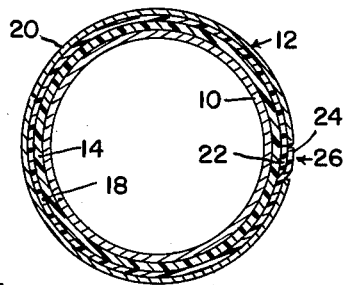
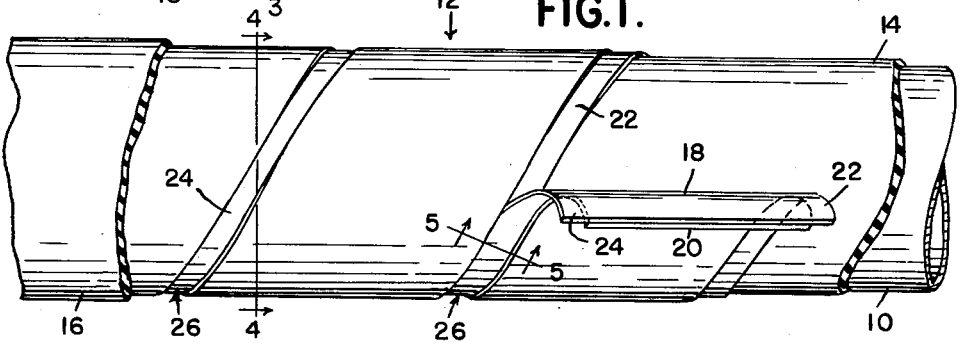
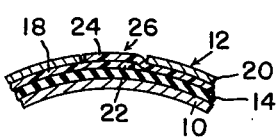
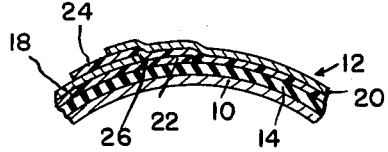
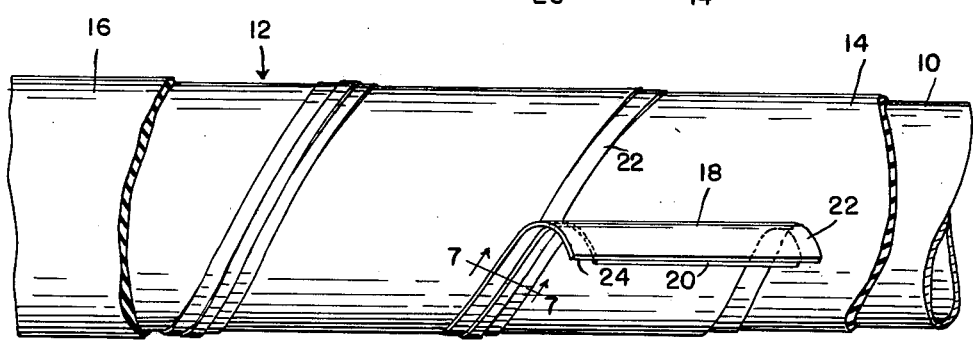
INVENTOR.
TED KENNEDY JR.
BY Whittemore, Hulbert & Belknap
ATTORNEYS United States Patent Office 3,126,034
Patented Mar. 24, 1964

3,126,034
PIPE WRAPPING
Ted Kennedy, Jr., Ann Arbor, Mich., assignor to The Trenton Corporation, Ann Arbor, Mich., a corporation of Michigan
Filed Dec. 5, 1960, Ser. No. 73,808
7 Claims. (Cl. 138—144)

This invention relates generally to a pipe wrapper composed of an elongated thin flexible composite strip having a plastic film bonded to one side of a carrier board and is a continuation-in-part of my copending application erial No. 787,633, filed January 19, 1959.

One object of the invention is to provide a pipe wrapper composed of a relatively thin flexible composite strip having a plastic film bonded to one side of a carrier board which is so constructed and so applied to the pipe that there will be no penetration of moisture through the wrapper or past any joints thereof to the pipe's surface. Preferably the wrapper is spirally or helically wound about the pipe so that the plastic surfaces of succeeding convolutions sealingly engage in a continuous overlapped joint, with the plastic side toward the pipe; hence moisture absorbed by the carrier board cannot penetrate the continuous moisture barrier.

Another object of the invention is to provide a pipe wrapper composed of a relatively thin flexible composite strip having a plastic film bonded to one side only of a carrier board wherein the plastic film extends over and beyond the edges of the carrier board. According to this construction, and when the wrapper is applied with the plastic surface toward the pipe in a spiral overlap, the inner surface of the plastic film will overlap the extended plastic margin of the underlying convolutions in a continuous sealed joint to completely exclude moisture. In this regard, the lead of the helix may be such that the plastic edges only overlap. Preferably, however, a greater overlap is provided so that the carrier board portion of succeeding convolutions completely overlies and covers the sealed joint formed by the engagement between the projecting marginal plastic of the underlying convolution with the inner plastic surface of the overlying convolution. According to this preferred arrangement, an extended plastic surface is required along one edge of the carrier board only. However, I prefer to provide the plastic film extension along both edges so that the wrapper cannot be misapplied.

Another object is to provide a pipe wrapper composed of a relatively thin flexible composite strip having a plastic film bonded to a carrier board wherein the carrier board is formed of a strong, abrasive-resistant heat-insulating material to protect the plastic film from shrinkage due to the heat of other pipe coatings and to protect the plastic film from mechanical damage.

Another object to provide a pipe wrapper as described above having a plastic component which will provide dielectric resistance, good electric installation and waterproofing properties, which will be inert and be resistant to soil chemicals and bacteria.

Another object is to provide a pipe wrapper as described above wherein the carrier board provides a surface to which an external coating will readily bond and which will become saturated with the external coating.

Other objects, advantages and novel details of construction will become more apparent as this description proceeds, especially when considered with the accompanying drawings, wherein:

FIGURE 1 is an illustration of a typical installation wherein the flexible composite wrapper of my invention forms one component of the pipe covering.

FIGURE 2 is a fragmentary plan view of my composite strip pipe wrapper.

FIGURE 3 is a section view taken on the line 3—3 of FIG. 2.

FIGURE 4 is a sectional view taken on the line 4—4 of FIGURE 1.

FIGURE 5 is a sectional view taken on the line 5—5 of FIGURE 1.

FIGURE 6 is similar to FIGURE 1 but shows the flexible composite strip wrapper applied differently.

FIGURE 7 is a sectional view taken on the line 7—7 of FIGURE 6.

Referring now more particularly to the drawings and especially to FIGURES 1-5, the numeral 10 designates a pipe, conduit or like elongated element which is intended to be installed in the ground. The numeral 12 generally designates my relatively thin flexible composite strip wrapper which forms a component of the pipe covering and provides a protective barrier around the pipe to prevent deterioration thereof as a result of various conditions, phenomena or elements of the soil in which the pipe is installed. The reference numeral 14 denotes a coating component applied to the pipe before the strip wrapper 12 is applied thereto. The coating component may be a heat softenable thermoplastic such as a bitumin or microcrystalline wax which is applied hot, or a cold applied adhesive material. A second coating component 16 is applied to the pipe over the wrapper 12, and may be of the same material as the coating 14.

In accordance with the invention, the wrapper strip 12 is composed of a continuous relatively thin flexible elongated plastic film 18 bonded to one side only of a relatively thin flexible elongated carrier board 20. The plastic film 18 may be formed of polyethylene, polyvinylidene chloride, cellulose acetate, or other synthetic resinous plastic material. Saturated or unsaturated industrial paper, metal, cloth, rubber or other suitable material may be used as the carrier board 20 of the wrapper although preferably the carrier board will have a fibrous outer surface to which the outer coating component 16 can readily bond and is of a nature to become saturated with the coating.

The composite wrapper strip 12 may be produced by extruding or otherwise bonding the plastic film 18 to the carrier board 20. As illustrated in the drawings, the plastic film 18 is bonded to one side only of the carrier board 20 and extends laterally outwardly beyond the longitudinal edges of the carrier board. The construction provides lips 22 and 24 of plastic at both edges of the carrier board suitable for forming a lapped joint as indicated at 26.

The wrapper strip 12 may be applied to pipe 10 by helically wrapping the same about the pipe as shown in FIGURE 1. The wrapper strip is wound about the pipe with a lead such that lip 24 overlies and contacts the lip 22 in a continuous spiral overlap joint. With the wrapper 12 applied as shown, the underlying lip 22 will be in direct contact with the underside of the overlapping plastic material even if the overlap should be greater than that shown and lip 24 is omitted. Under those conditions when the undercoating material shall have extruded into the lap the plastic film 18 will be in direct contact with the coating in the lap joint 26. Since the strip 12 is wrapped with the plastic side toward the pipe and the carrier board on the outer side and because the plastic lips provide a continuous sealed joint, under no circumstances will the carrier board 20 come into contact with the pipe nor in any moisture which might have been absorbed by the carrier board find its way to the pipe. The plastic film 18, being continuously sealed at the joints, provides in effect a continuous plastic barrier thus separating the carrier board from the pipe.

The pipe surface is preferably initially coated with the component indicated at 14 and the wrapper strip 12 applied thereover, as shown. However, the strip 12 may be applied to the uncoated pipe. Preferably the coating 16 is then applied over the coated and wrapped pipe.

The plastic lips 22 and 24 continuously engage one another in a sealed joint, and preferably a weld or heat seal is effected by the application of heat, with or without a suitable solvent. The heat of a hot applied coating 14 or 16 may be utilized to effect the heat seal at the plastic lap joint 26. In order for a heat seal to result, the plastic material must be such that it will heat seal at the temperature of the coating upon contact therewith. Thus if the heat seal is to be effected by the heat of a hot applied coating 14, the wrapper strip must be applied thereover before the temperature of the coating drops below the minimum sealing temperature of the plastic, and if the heat of the hot applied coating 16 is relied upon to effect the heat seal, it must be applied at a temperature not less than the minimum sealing temperature of the plastic. In instances where the undercoating extrudes into the lap joint 26, the plastic lips at the point of extrusion will not contact each other but will, in cooperation with the extruded plastic in sealed contact therewith, cooperate to provide a moisture proof barrier. Hence there can be no penetration of moisture through the plastic film 18, even at the lap joint 26, as a result of moisture being absorbed by the carrier board.

The plastic film 18 also provides the pipe with high dielectric resistance and good electrical installation and water-proofing properties, and is inert and resistant to soil chemicals and bacteria.

The carrier board 20 protects the plastic film 18 from shrinkage due to the heat of one or both coatings 14 and 16. The carrier board does this by reason of its heat insulating character and also by reason of its being bonded in surface-to-surface relation with the plastic film. Preferably to accomplish this result, the carrier board should be formed of industrial paper or cloth which is relatively shrink-proof at the elevated temperatures involved and is of a heat insulating character. The coatings may be applied at temperatures as high as 350° F. Most wax type coating materials available to the trade have a softening point in the neighborhood of 160° F. and would be applied to the pipe at temperatures in a range of 250° F. to 350° F. The temperature of application will depend upon the minimum softening temperature of film 18 if the heat of the coating is relied upon to effect a heat seal. The carrier board 20 is also preferably formed of a material which provides a surface which will be saturated with and bond well with external coating 16. Industrial paper and cloth are suitable carrier board materials for this purpose, because of their fibrous nature.

Referring to FIGURES 6 and 7, a modification of the invention is shown. The only difference between the modified pipe wrapping and that described in connection with FIGURES 1–5 is that a wider overlap is provided. The width of the overlap throughout the length of the wrap exceeds the sum of the widths of lips 22 and 24 so that the plastic lip 22 is sealed to the plastic inner surface of the overlapping convolution but inwardly of the lip 24. Therefore the entire plastic barrier, including the overlap plastic joint, is covered and shielded by the carrier board. This construction provides a better protection for the plastic film, since the plastic barrier is completely shielded by the abrasion-resistant carrier board. The plastic joint between the lip 22 and the overlapping plastic is a sealed joint which may be heat sealed in the same manner as that described above in connection with the first embodiment.

The inner plastic film 18 provides in effect a solid plastic barrier between the carrier board and the pipe. The lip 24 will seal to the coating saturated carrier board to provide a second sealed joint at the overlap. While lip 24 is therefore desirable, it may be omitted since the primary seal for the joint 26 at the overlap is provided between the lip 22 and the overlapping plastic, this joint being completely shielded by the carrier board. It is desirable in any case to form the composite strip 12 with two lips, 22 and 24, so that the strip can never be misapplied, as it might be if only one lip were provided.

What I claim as my invention is:

1. In combination, a conduit, a covering for said conduit comprising an elongated flexible sheet-like carrier board of a strong abrasion-resistant heat-insulating material, an elongated flexible synthetic resinous plastic film coextensive with and permanently bonded in surface-to-surface relation to one side of said carrier board to provide an elongated composite wrapper consisting only of said carrier board and plastic film and sufficiently flexible to be readily wound about the conduit, said film extending laterally outwardly beyond one longitudinal edge of said carrier board to provide a continuous plastic lap surface, said composite wrapper being wound helically about said conduit with the plastic film toward said conduit and with a lead such that the lap surface of the underlying convolution is overlapped and sealingly engaged by the inner surface of the plastic film of the overlapping convolution in a continuous overlap joint, the plastic film of said helical composite wrapper providing a dielectric moisture proof, continuous inner plastic barrier which is resistant to soil chemicals and bacteria and is completely sealed at said continuous overlap joint, the carrier board of said helical composite wrapper providing an outer cover for said plastic film protecting the same against mechanical damage, said carrier board preventing said plastic film from shrinking by reason of its heat-insulating character and by reason of its being bonded in surface-to-surface relation to said plastic film.

2. The combination defined in claim 1, wherein said composite wrapper is wound with a lead such that the carrier board of the overlapping convolution overlies and completely covers and protects said lap surface of the underlying convolution including the continuous overlap joint.

3. In combination, a conduit, a covering for said conduit comprising an elongated flexible sheet-like carrier board of a strong abrasion-resistant heat insulating material, an elongated flexible synthetic resinous plastic film coextensive with and permanently bonded in surface-to-surface relation to one side of said carrier board to provide an elongated composite wrapper consisting only of said carrier board and plastic film and sufficiently flexible to be readily wound about the conduit, said film extending laterally outwardly beyond both longitudinal edges of said carrier board to provide continuous plastic lap surfaces, said composite wrapper being wound helically about said conduit with the plastic film toward said conduit and with a lead such that the underlying lap surface sealingly engages the inner surface of the plastic film of the overlapping convolution in a continuous overlap joint, the plastic film of said helical composite wrapper providing a dielectric moisture proof, continuous inner plastic barrier which is resistant to soil chemicals and bacteria and is completely sealed at said continuous overlap joint, the carrier board of said helical composite wrapper providing an outer cover for said plastic film protecting the same against mechanical damage, said carrier board preventing said plastic film from shrinking by reason of its heat insulating character and by reason of its being bonded in surface-to-surface relation to said plastic film.

4. The combination defined in claim 3, wherein said composite wrapper is wound with a lead such that the lap surface of the overlying convolution overlies and sealingly engages the lap surface of the underlying convolution to provide the continuous lap joint.

5. The combination defined in claim 3, wherein said composite wrapper is wound with a lead such that the carrier board of the overlying convolution overlies and completely covers and protects the lap surface of the underlying convolution as well as the continuous overlap joint.

6. The combination defined in claim 5, wherein a coating is applied over said helical composite wrapper, said carrier board is dielectric, has a fibrous outer surface to which said coating can readily bond and which absorbs and becomes saturated with the coating, and said overlying lap surface is sealed continuously to the coating saturated carrier board of the underlying convolution.

7. In combination, a conduit, a covering for said conduit comprising an elongated flexible sheet-like carrier board of a strong abrasion-resistant heat-insulating material, an elongated flexible synthetic resinous plastic film coextensive with and permanently bonded in surface-to-surface relation to one side of said carrier board to provide an elongated composite wrapper consisting only of said carrier board and plastic film and sufficiently flexible to be readily wound about the conduit, said carrier board presenting a continuous exposed surface throughout the length of said wrapper on the outer side of the latter, said plastic film extending laterally outwardly beyond one longitudinal edge of said continuous surface of said carrier board to provide a continuous exposed plastic lap surface along said continuous surface of said carrier board which lap surface is also on the outer side of said wrapper, said plastic film presenting a continuous exposed surface throughout the length and width of said wrapper on the inner side thereof, said composite wrapper being wound helically about said conduit with said inner side of said wrapper toward said conduit and with a lead such that the lap surface of the underlying convolution is overlapped and sealingly engaged by said inner continuous surface of the plastic film of the overlapping convolution in a continuous overlap joint, the plastic film of said helical composite wrapper providing a dielectric moisture proof, continuous inner plastic barrier which is resistant to soil chemicals and bacteria and is completely sealed at said continuous overlap joint, the carrier board of said helical composite wrapper providing an outer cover for said plastic film protecting the same against mechanical damage, said carrier board preventing said plastic film from shrinking by reason of its heat-insulating character and by reason of its being bonded in surface-to-surface relation to said plastic film.

References Cited in the file of this patent

UNITED STATES PATENTS

| | | |
|---|---|---|
| Re. 20,435 | Dieffenbach | July 6, 1937 |
| 1,742,775 | Mallay | Jan. 7, 1930 |
| 1,958,131 | Davidson | May 20, 1934 |
| 2,225,026 | Welsh | Dec. 17, 1940 |
| 2,307,406 | Howard | Jan. 5, 1943 |
| 2,350,132 | Rohden | May 30, 1944 |
| 2,713,551 | Kennedy | July 19, 1955 |
| 2,745,591 | Holt | May 15, 1956 |
| 2,937,665 | Kennedy | May 24, 1960 |